United States Patent [19]

Sauri

[11] Patent Number: 5,468,038
[45] Date of Patent: Nov. 21, 1995

[54] MULTIPLE CONFIGURATION TAILGATE EXTENDER

[76] Inventor: Gregory M. Sauri, 822 W. Centerville Rd. #130, Garland, Tex. 75041

[21] Appl. No.: 301,126

[22] Filed: Sep. 6, 1994

[51] Int. Cl.⁶ .................................................. B62D 33/02
[52] U.S. Cl. ............................................ 296/57.1; 296/26
[58] Field of Search ............................. 296/50, 51, 57.1, 296/37.6, 61, 62, 26

[56] References Cited

U.S. PATENT DOCUMENTS

| | | |
|---|---|---|
| 97,808 | 12/1869 | Powell et al. . |
| 1,919,063 | 7/1933 | Hubbard .................... 296/26 |
| 2,852,303 | 9/1958 | Hopson . |
| 3,085,826 | 4/1963 | Carreau . |
| 4,023,850 | 5/1977 | Tillery ...................... 296/26 |
| 4,114,944 | 9/1978 | Joynt et al. ................ 296/50 |
| 4,472,639 | 9/1984 | Bianchi ..................... 296/26 |
| 4,531,773 | 7/1985 | Smith ....................... 296/26 |
| 4,596,417 | 6/1986 | Bennett ..................... 296/61 |
| 4,639,032 | 1/1987 | Barbour .................... 296/62 |
| 4,778,213 | 10/1988 | Palmer ..................... 296/26 |
| 4,856,840 | 8/1989 | Hanley ..................... 296/26 |
| 4,884,838 | 12/1989 | Slater ................... 296/57.1 X |
| 5,154,470 | 10/1992 | Bringman, Jr. .............. 296/26 |
| 5,205,603 | 4/1993 | Burdette, Jr. ............... 296/62 |
| 5,244,335 | 9/1993 | Johns ...................... 296/61 |

FOREIGN PATENT DOCUMENTS 1244858  11/1988  Canada .

Primary Examiner—Joseph D. Pape
Attorney, Agent, or Firm—John F. Bryan

[57] ABSTRACT

A vehicle tailgate extender includes an extension member retractably mounted between inner and outer tailgate walls. The extension member is movable between operative and stowed positions, wherein the stowed position of the extension members is substantially entirely enclosed by the tailgate walls. In the operative position the extension member extends from an opening in a top surface of the tailgate located intermediate the tailgate walls.

12 Claims, 4 Drawing Sheets

MULTIPLE CONFIGURATION TAILGATE EXTENDER

FIELD OF INVENTION

The present invention relates to load carrying vehicles, and more particularly to a multiple configuration tailgate extender for a vehicle.

BACKGROUND ART

It is common to provide a drop-down type tailgate for a motor vehicle such as a pickup truck. Such vehicles are used to carry a wide variety of objects, such as furniture, appliances, lumber, tools, and other bulky items. A major hazard associated with carrying objects in a pickup truck bed with a drop-down tailgate is that they may come loose and roll off the bed and tailgate, particularly where the size of the item requires that the item be transported with the tailgate in the down position. Objects extending from the rear of such a vehicle, with the tailgate down, also create a hazard for other vehicles that follow behind the extending load.

Thus there presently exists a need for a extension device that is compact when stowed yet readily openable to extend the useful area, including the ends and sides, of a vehicle tailgate. A particularly unmet need in the art is a tailgate extension that provides for multiple configurations, whereby the amount of increased space is selectable at the option of the user.

SUMMARY OF THE INVENTION

The present invention provides an extender for a vehicle tailgate that is configured so that selectable configurations provide an extended load carrying area for the vehicle. In a first configuration, an increased confined load carrying area approximately the size of the tailgate is provided. In a second configuration, a first extension member and a second extension member, each with specially adapted closure members, provide double the increased area provided by the first configuration.

BRIEF DESCRIPTION OF THE DRAWINGS

A more complete understanding of the invention and its advantages will be apparent from the Detailed Description taken in conjunction with the accompanying Drawings in which.

DETAILED DESCRIPTION

Figure 1:
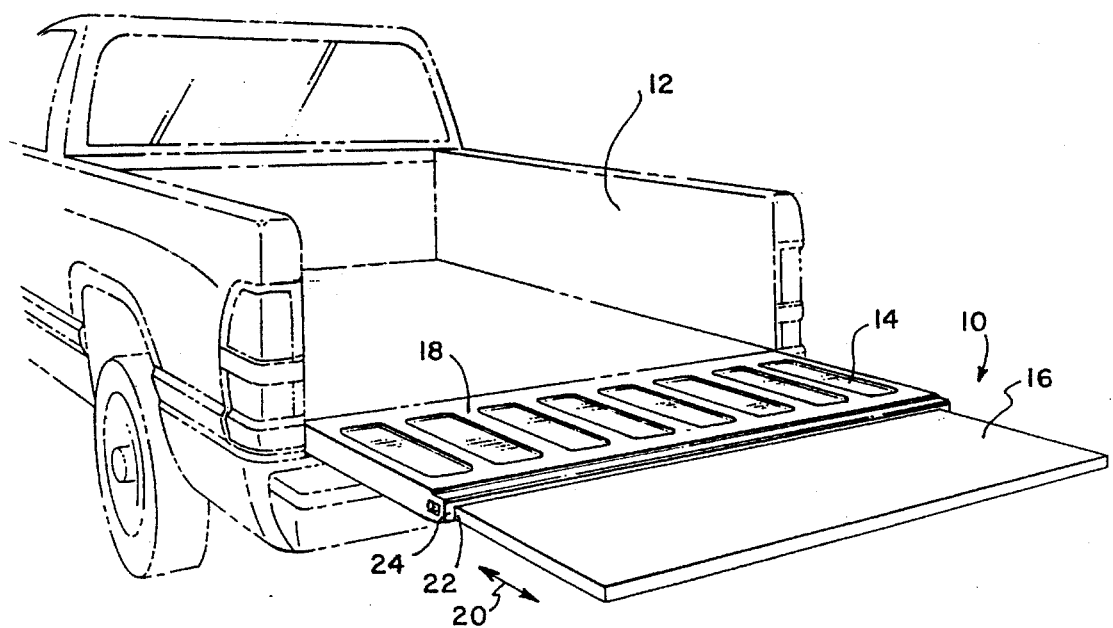
FIG. 1 is a perspective view of a first embodiment of the vehicle tailgate extender.

Referring initially to FIG. 1, a vehicle tailgate extender 10 is incorporated in a pickup truck 12 having a conventional drop-down type tailgate 14. The tailgate extender 10 includes an extension member 16 retractably mounted within inner and outer tailgate walls, the inner tailgate wall being denoted by reference numeral 18 and the outer tailgate wall being not shown. Extension member 16 is movable between operative and stowed positions as showed by arrows 20. FIG. 1 illustrates the operative position, where the effective area of tailgate 14 is approximately doubled. In the stowed position the extension member is substantially entirely enclosed by the tailgate walls. In the operative position as shown, the extension member 14 extends from an opening 22 in the top surface 24 of the tailgate 14, with the opening 22 being located intermediate the tailgate walls.

The vehicle tailgate extender of FIG. 1 is made possible by the fact that conventional tailgates are typically relatively thick assemblies formed of widely spaced inner and outer walls made of sheet metal. The inner and outer walls enclose a substantial amount of empty space which may utilized in this invention to enclose the tailgate extender in the stowed position.

Figure 2:
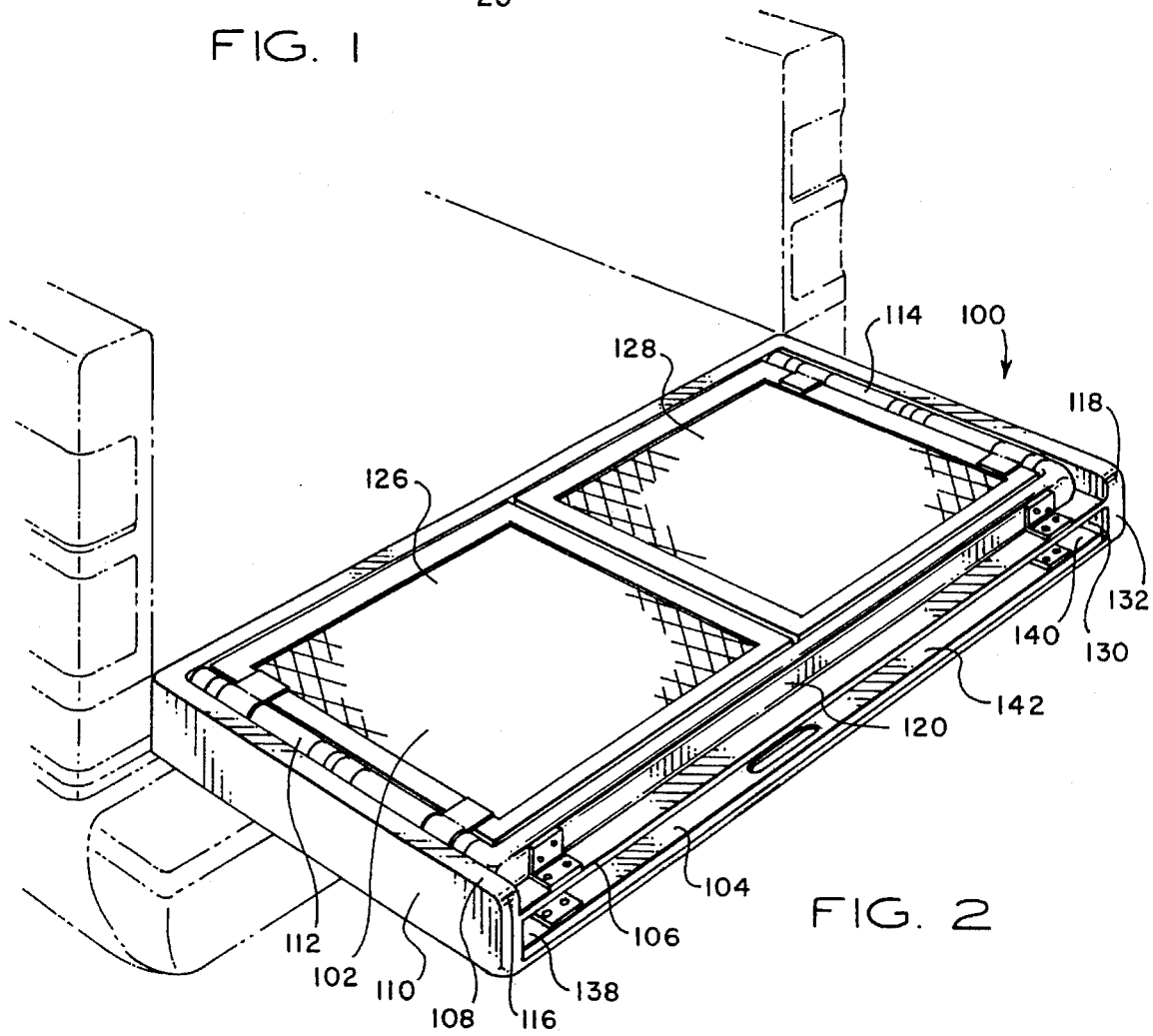
FIGS. 2–5 are perspective views of the multiple configuration tailgate extender of the present invention.
Figure 3:
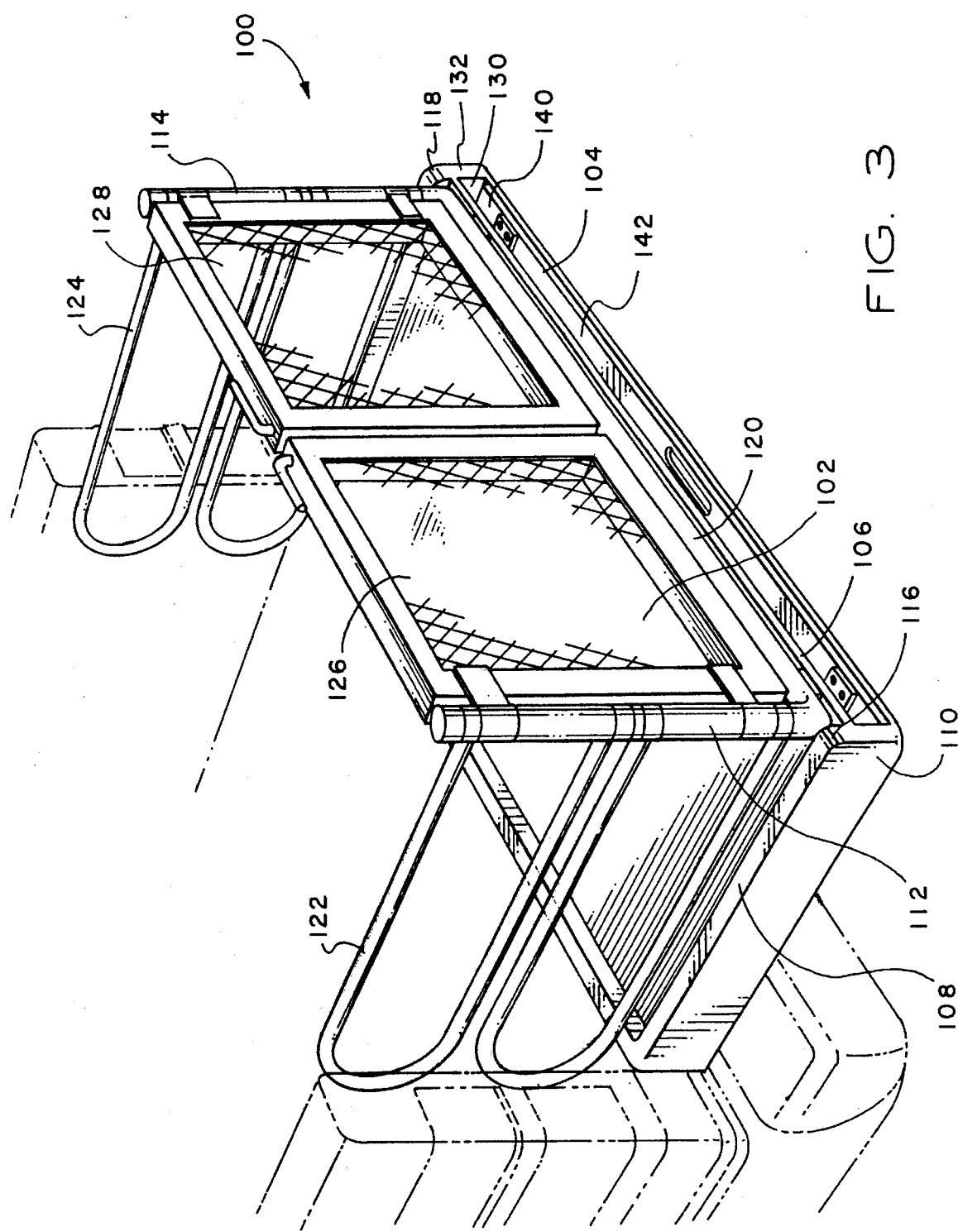
Figure 4:
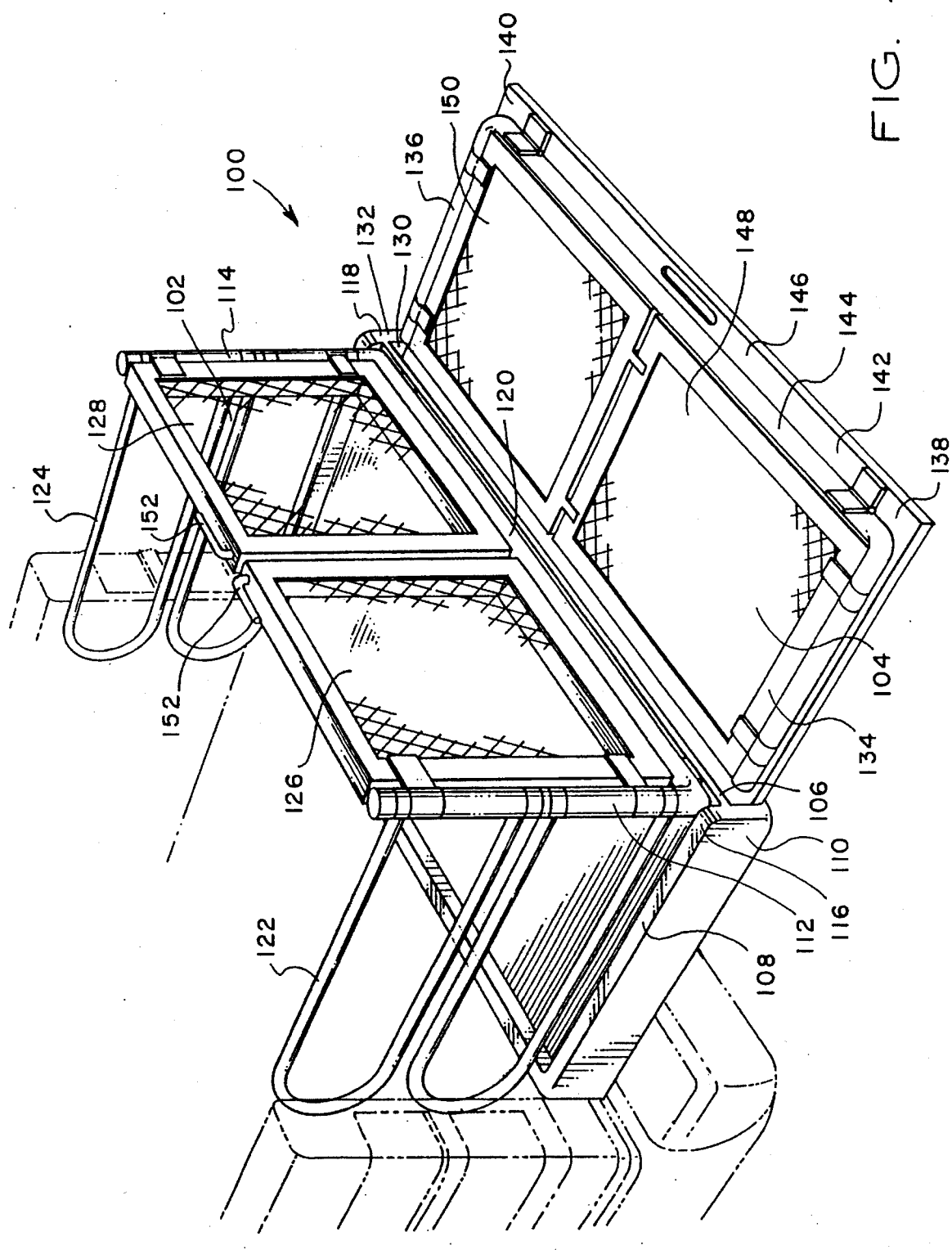

Referring now to FIGS. 2–5, where like numerals indicate like and corresponding elements, a multiple configuration tailgate extender is provided to permit user-selectable incremental amounts of additional stowage space. Extender 100 includes a first extension member 102 movable between a stowed position, shown in FIG. 2, and a first operative position, shown in FIGS. 3 and 4, and a second operative position shown in FIG. 5. A second extension member 104 is movable between a stowed position, as shown in FIGS. 2 and 3, and an operative position shown in FIG. 5. FIG. 4 shows the second extension member 104 partially moved to the operative position.

First extension member 102 is hingedly connected to an upper edge 106 of an inner wall 108 of a tailgate 110. The inner wall 108 is recessed with respect to the sides of the tailgate 110 such that the first extension member 102 is substantially flush with the tailgate sides when in the stowed position, as shown in FIG. 2. First extension member 102 has first and second side posts 112, 114 located at first and second outer corner portions 116, 118 of the tailgate 110, respectively. The first extension member side posts 112, 114 are connected by a center portion 120 to form a U-shape, with the center portion 120 being hingedly connected at the tailgate upper edge 106.

Figure 5:
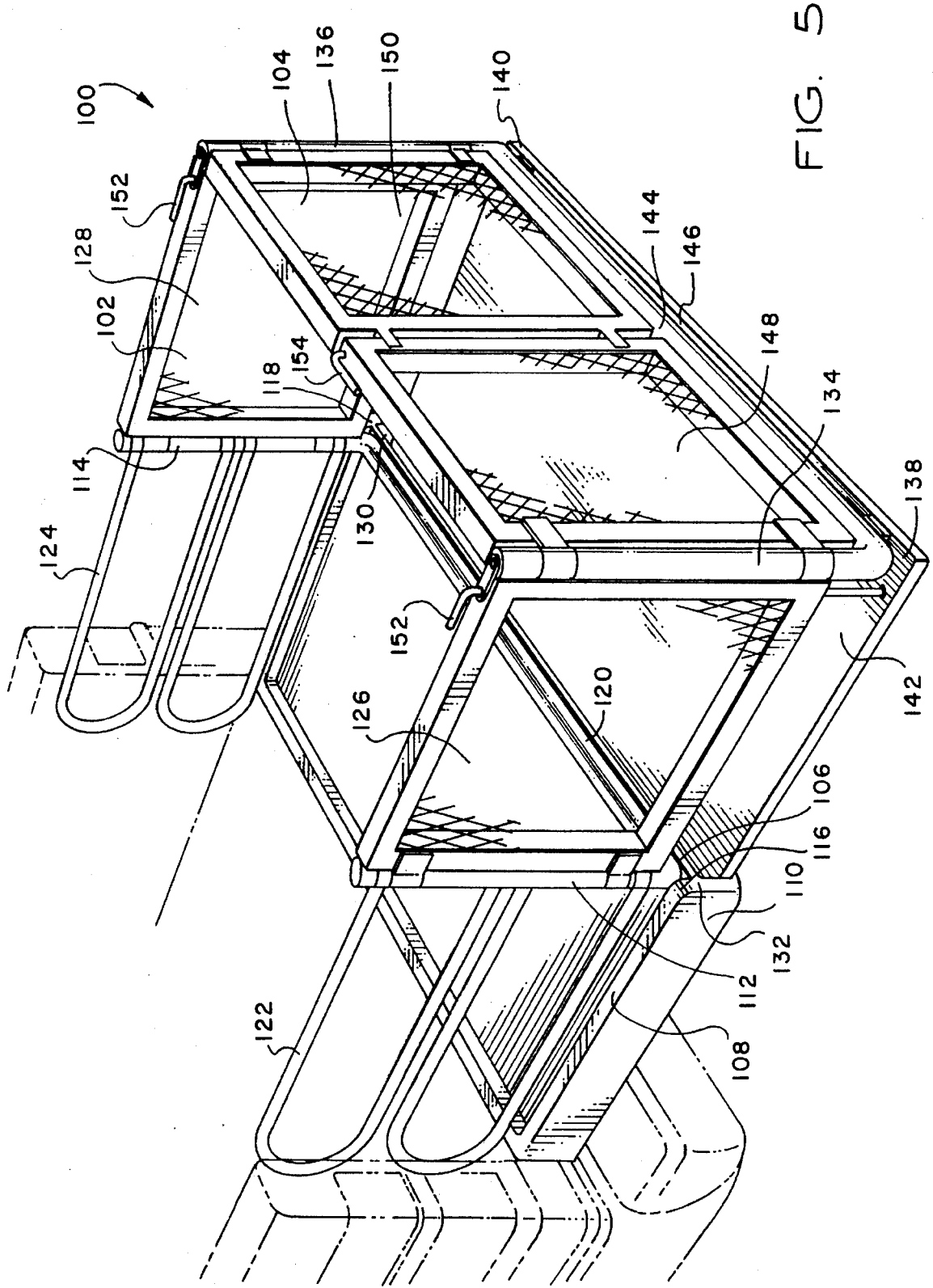

First extension member 102 has a plurality of closure members adapted to form vertical closures when the first extension member 102 is in the first and second operative positions. The first extension member closure members are hingedly connected to the first extension member side posts 112, 114. The first extension member closure members include first and second side closure members 122, 124 and first and second multiposition closure members 126, 128. Specifically, the first side closure member 122 and the first multiposition closure member 126 are hingedly mounted to the first side post 112. Similarly, the second side closure member 124 and the second multiposition closure member 128 are hingedly mounted to the second side post 114. The first extension member side closure members 122, 124 are movable with respect to the side posts 112, 114 to form vertical forward side closures when the first extension member 102 is in the first and second operative positions, as shown in FIGS. 3 and 5. The first extension member multiposition closure members 126, 128 are movable with respect to the side posts 112, 114 to form vertical end closures, when the first extension member is in the first operative position (FIG. 3), and vertical rearward side closures, when the first extension member is in the second operative position (FIG. 5).

The second extension member 104 is retractably mounted within the inner tailgate wall 108 and an outer tailgate wall (not shown). Second extension member 104 is movable between the operative and stowed positions, where in the stowed position the second extension member 104 is substantially entirely enclosed by the tailgate walls. In the operative position, the extension member extends from an opening 130 in a top surface 132 of the tailgate located intermediate the tailgate walls.

The second extension member has first and second end posts 134, 136 located at first and second outer corner portions 138, 140 of a bottom surface 142 of the second extension member 104. The second extension member end posts 134, 136 are connected by center portion 144 to form a U-shape, with the center portion 144 being hingedly connected at an outer edge 146 of the bottom surface 142.

The second extension member of 104 has a plurality of closure members adapted to form vertical closures when the second extension member 104 is in the operative position. The second extension member closure members are hingedly connected to the second extension member end posts 134, 136. The second extension member closure members include first and second end enclosure members 148, 150. Specifically, the first end closure member 148 is hingedly mounted to the first end post 134, and the second end closure member 150 is hingedly mounted to the second end post 136. The second extension member end closure members 148, 150 are movable with respect to the end posts 134, 136 to form openable vertical end closures, when the first extension member is in the second operative position and the second extension member is in the operative position.

In operation, the extender of FIG. 1 is a basic unit that permits the ready extension of tailgate by simply sliding the extension member 16 to the operative position, as shown. Long cargo objects, such as lumber or rolled carpet can be much more conveniently transported, without fear of load loss due to insufficient tailgate length. While the embodiment of FIG. 1 is useful in many situations, it is anticipated that the preferred embodiment of FIGS. 2–5 will have much greater utility and user acceptance.

The multiple configuration tailgate extender of FIGS. 2–5 permits not only extension of the tailgate but also the deployment of side closures and end closures for each stage of extension. The multiposition closure members serve dual purposes, in the first operative position they are used as end closure members, while in the second operative position they form rearward side closure members. The first extension member is recessed into the inner surface of the tailgate, while the second extension member is enclosed within the inner and outer walls of the tailgate, thus providing a compact device when stowed. Relatively simple latching bars 152 and 154 are provided to secure the closure members in the respective configurations, although other and equivalent latching mechanisms will be known. In addition, it is anticipated that some users will desire removable further closure members that extend higher than the sides of the pickup bed and extend forwardly to the roof of the cab, although these further extension members are not shown.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. An extender for a vehicle tailgate, comprising:

an extension member movable between a stowed position and an operative position;

the extension member being hingedly connected to an upper edge of an inner wall of the tailgate, the inner wall being recessed with respect to sides of the tailgate such that the extension member is substantially flush with respect to the tailgate sides when in the stowed position;

the extension member having first and second side posts located at first and second outer corner portions of the tailgate, respectively;

the extension member having a plurality of closure members adapted to form vertical closures when the extension member is in the operative position; and the extension member closure members being hingedly connected to the extension member side posts.

2. The extender of claim 1 with the extension member side posts being connected by a center portion to form a U-shape, and with the center portion being hingedly connected at the tailgate upper edge.

3. The extension member of claim 1 with the extension member closure members including first and second side closure members and first and second multiposition closure members;

the first side closure member and first multiposition closure member being hingedly mounted to the first side post, and the second side closure member and second multiposition closure member being hingedly mounted to the second side post;

the extension member side closure members being movable with respect to the side posts to form vertical forward side closures when the extension member is in the operative position; and the extension member multiposition closure members being movable with respect to the side posts to form openable vertical end closures when the extension member is in the operative position.

4. An extender for a vehicle tailgate, comprising:

an extension member movable between a stowed position and an operative position;

the extension member being hingedly connected to an upper edge of an inner wall of the tailgate;

the inner wall being recessed with respect to sides of the tailgate such that the extension member is substantially flush with respect to the tailgate sides when in the stowed position;

the extension member having first and second side posts located at first and second outer corner portions of the tailgate, respectively;

the extension member side posts being connected by a center portion to form a U-shape, with the center portion being hingedly connected at the tailgate upper edge;

the extension member having a plurality of closure members adapted to form vertical closures when the extension member is in the operative position;

the extension member closure members being hingedly connected to the extension member side posts;

the extension member closure members including first and second side closure members and first and second multiposition closure members;

the first side closure member and first multiposition closure member being hingedly mounted to the first side post, and the second side closure member and second multiposition closure member being hingedly mounted to the second side post;

the extension member side closure members being movable with respect to the side posts to form vertical forward side closures when the extension member is in the operative position; and the extension member multiposition closure members being movable with respect to the side posts to form openable vertical end closures when the extension member is in the operative position.

5. An extender for a vehicle tailgate, comprising:

a first extension member movable between a stowed position, a first operative position, and a second operative position;

a second extension member movable between a stowed position and an operative position;

the first extension member being hingedly connected to an upper edge of an inner wall of the tailgate;

the first extension member having first and second side posts located at first and second outer corner portions of the tailgate, respectively;

the first extension member having a plurality of closure members mounted to the side posts and adapted to form vertical closures when the first extension members is in the first and second operative position;

the first extension member closure members including first and second side closure members and first and second multiposition closure members;

the first extension member side closure members being movable with respect to the side posts to form vertical forward side closures when the first extension member is in the first and second operative positions;

the first extension member multiposition closure members being movable with respect to the side posts to form vertical end closures, when the first extension member is in the first operative position, and vertical rearward side closures, when the first extension member is in the second operative position;

the second extension member having first and second end posts located at first and second outer corner portions of a bottom surface of the second extension member, respectively;

the second extension member having a plurality of closure members mounted to the end posts and adapted to form vertical closures when the second extension member is in the operative position;

the second extension member closure members including first and second end closure members; and the second extension member end closure members being movable with respect to the end posts to form openable vertical end closures, when the first extension member is in the second operative position and the second extension member is in the operative position.

6. The extender of claim 5 with the inner wall being recessed with respect to sides of the tailgate such that the first extension member is substantially flush with respect to the tailgate sides when in the stowed position.

7. The extender of claim 5 with the first extension member side posts being connected by a center portion to form a U-shape, with the center portion being hingedly connected at the tailgate upper edge.

8. The extender of claim 5 with the first side closure member and first multiposition closure member being hingedly mounted to the first side post, and the second side closure member and second multiposition closure member being hingedly mounted to the second side post.

9. The extender of claim 5 with the first end closure member being hingedly mounted to the first end post, and the second end closure member being hingedly mounted to the second end post.

10. The extender of claim 5 with the second extension member being retractably mounted within the inner tailgate wall and an outer tailgate wall and movable between the operative and stowed positions, where in the stowed position the extension member is substantially entirely enclosed by the tailgate walls, and in the operative position the extension member extends from an opening in a top surface of the tailgate located intermediate the tailgate walls.

11. The extender of claim 5 with the second extension member end posts being connected by a center portion to form a U-shape, with the center portion being hingedly connected at an outer edge of the bottom surface.

12. An extender for a vehicle tailgate, comprising:

a first extension member movable between a stowed position, a first operative position, and a second operative position;

a second extension member movable between a stowed position and an operative position;

the first extension member being hingedly connected to an upper edge of an inner wall of the tailgate;

the inner wall being recessed with respect to sides of the tailgate such that the first extension member is substantially flush with respect to the tailgate sides when in the stowed position;

the first extension member having first and second side posts located at first and second outer corner portions of the tailgate, respectively;

the first extension member side posts being connected by a center portion to form a U-shape, with the center portion being hingedly connected at the tailgate upper edge;

the first extension member having a plurality of closure members adapted to form vertical closures when the first extension member is in the first and second operative positions;

the first extension member closure members being hingedly connected to the first extension member side posts;

the first extension member closure members including first and second side closure members and first and second multiposition closure members;

the first side closure member and first multiposition closure member being hingedly mounted to the first side post, and the second side closure member and second multiposition closure member being hingedly mounted to the second side post;

the first extension member side closure members being movable with respect to the side posts to form vertical forward side closures when the first extension member is in the first and second operative positions;

the first extension member multiposition closure members being movable with respect to the side posts to form vertical end closures, when the first extension member is in the first operative position, and vertical rearward side closures, when the first extension member is in the second operative position;

the second extension member being retractably mounted within the inner tailgate wall and an outer tailgate wall and movable between the operative and stowed positions, where in the stowed position the second extension member is substantially entirely enclosed by the tailgate walls, and in the operative position the extension member extends from an opening in a top surface of the tailgate located intermediate the tailgate walls;

the second extension member having first and second end posts located at first and second outer corner portions of a bottom surface of the second extension member, respectively;

the second extension member end posts being connected by a center portion to form a U-shape, with the center portion being hingedly connected at an outer edge of the bottom surface;

the second extension member having a plurality of closure members adapted to form vertical closures when the second extension member is in the operative position;

the second extension member closure members being hingedly connected to the second extension member end posts;

the second extension member closure members including first and second end closure members;

the first end closure member being hingedly mounted to the first end post, and the second end closure member being hingedly mounted to the second end post; and the second extension member end closure members being movable with respect to the end posts to form openable vertical end closures, when the first extension member is in the second operative position and the second extension member is in the operative position.

* * * * *